US009571220B2

United States Patent
Xia et al.

(10) Patent No.: US 9,571,220 B2
(45) Date of Patent: Feb. 14, 2017

(54) FLEXIBLE CHANNEL COORDINATION FOR MULTIPLE OPTICAL CARRIER OPTICAL NETWORKS

(71) Applicant: Verizon Patent and Licensing Inc., Arlington, VA (US)

(72) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 377 days.

(21) Appl. No.: 14/283,588

(22) Filed: May 21, 2014

(65) Prior Publication Data

US 2015/0341135 A1  Nov. 26, 2015

(51) Int. Cl.
*H04J 14/02* (2006.01)
(52) U.S. Cl.
CPC ................... *H04J 14/0212* (2013.01)

(58) Field of Classification Search
CPC  H04J 14/0212; H04J 14/0213; H04J 14/0206; H04J 14/0204; H04J 14/0205
See application file for complete search history.

(56) References Cited

U.S. PATENT DOCUMENTS

| 2007/0274224 | A1* | 11/2007 | Suzuki | H04L 41/08 370/248 |
| 2009/0226172 | A1* | 9/2009 | Larikova | H04J 14/0205 398/83 |
| 2013/0216226 | A1* | 8/2013 | Hirano | H04J 14/0267 398/51 |

* cited by examiner

*Primary Examiner* — Ted Wang (57) ABSTRACT

One or more management systems coordinate wavelength configuration patterns of a plurality of multi-wavelength optical transport nodes in an optical network for a first transport period. The one or more management systems determine data traffic demand changes in the optical network; and coordinate wavelength configuration patterns of the plurality of multi-wavelength optical transport nodes in the optical network for a second transport period, that is subsequent to the first transport period, based on the determined data traffic demand changes.

23 Claims, 10 Drawing Sheets

FLEXIBLE CHANNEL COORDINATION FOR MULTIPLE OPTICAL CARRIER OPTICAL NETWORKS

BACKGROUND

Optical networks employing 10 gigabit Ethernet (10 GE) transport Ethernet frames at a rate of 10 gigabits per second. A router in such an optical network typically includes multiple client interfaces, each of which uses a single optical carrier (e.g., light of a single wavelength) for receiving and/or transmitting data. Transport equipment connects to the router via multiple client interfaces, which each use the single optical carrier, to receive data transmitted from the client interfaces of the router. The transport equipment may further include multiple transport cards, each of which transmits outgoing data over a single optical carrier. The transport equipment sends the data via the single optical carriers to destination transport nodes in the optical network.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Figure 1:
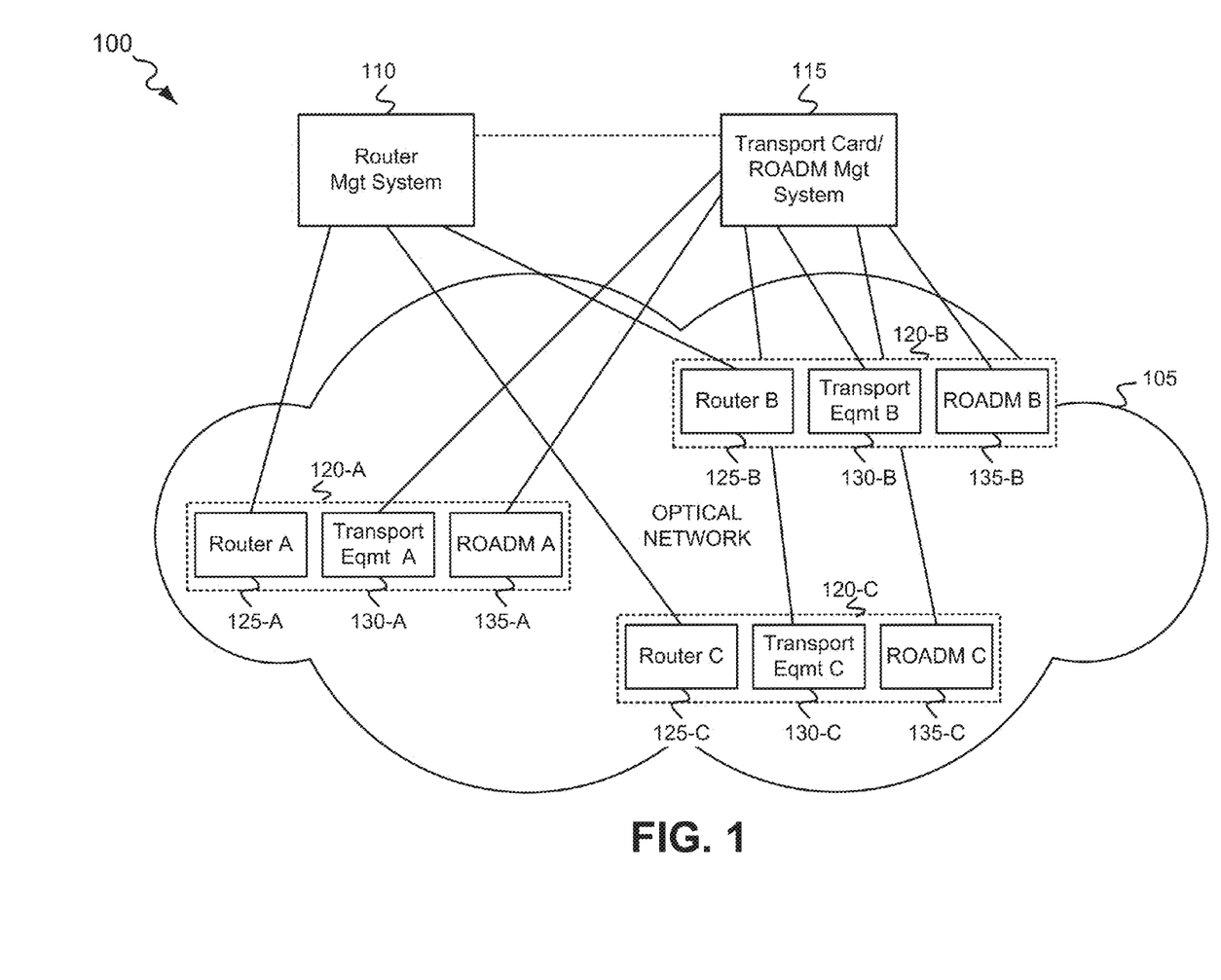
FIG. 1 is a diagram that depicts an exemplary network environment in which flexible channel coordination may be implemented in a multiple optical carrier optical network.

FIG. 1 is a diagram that depicts an exemplary network environment 100 in which flexible channel coordination may be implemented for a multiple optical carrier optical network. As shown, network environment 100 may include a multiple optical carrier optical network 105, a router management system 110, and a transport card/Reconfigurable Optical Add/Drop Multiplexer (ROADM) management system 115. In one implementation, the multiple optical carriers of optical network 105 may include light of multiple different wavelengths, such as multiple wavelengths $\lambda_1$ through $\lambda_n$ (where n is an integer greater than or equal to 2).

Multiple carrier optical network 105 may include multiple transport nodes, such as transport nodes 120-A, 120-B and 120-C (individually and generically referred to herein as a "transport node 120") depicted in FIG. 1, for routing, switching and transporting data traffic via multiple different optical carriers (e.g., wavelengths). Transport nodes 120-A, 120-B and 120-C are shown merely for purposes of illustration—optical network 105 may include other transport nodes in addition to transport nodes 120-A, 120-B and 120-C. As shown, transport node 120-A may include a router 125-A, transport equipment 130-A and ROADM 135-A. Transport node 120-B may include a router 125-B, transport equipment 120-B, and ROADM 135-B. Transport node 120-C may include a router 125-C (routers 125-A, 125-B and 125-C individually and generically referred to herein as "router 125"), transport equipment 130-C (transport equipment 130-A, 130-B and 130-C individually and generically referred to herein as "transport equipment 130"), and ROADM 135-C(ROADM 135-A, 135-B and 135-C individually and generically referred to herein as "ROADM 135"). Transport nodes 120 of optical network 105 may be interconnected via optical fibers, with each optical fiber carrying optical signals via one or more optical carriers (e.g., wavelengths). Transport nodes 120 may additionally connect to data traffic source or destination end nodes (not shown in FIG. 1) via optical fibers and/or electrical cables (e.g., coaxial cables).

Each router 125 may receive data traffic, either via electrical or optical transmission, and may use routing algorithms for routing the data traffic towards its destination as multiple optical carrier (e.g., multiple wavelength) optical signals via multiple client interfaces. Each router 125 may additionally queue, route and switch the received data traffic based on instructions received from router management system 110, as further described below. Each transport equipment 130 may include, as described further below with respect to FIG. 2, multiple client interfaces for receiving data traffic via multiple optical carrier optical signals, and multiple transport cards for transmitting the data traffic via multiple optical carrier optical signals to a respective ROADM 135. Each transport equipment 130 may receive and transmit the data traffic via the multi-wavelength optical signals based on instructions from transport card/ROADM management system 115, as further described below.

Each ROADM 135 may include any type of ROADM for multiplexing and demultiplexing data traffic carried via multiple optical carriers (e.g., multiple wavelengths. Each ROADM 135 may include, for example, a Planar Lightwave Circuit (PLC), a Wavelength Selective Switch (WSS) or a Wavelength Crossconnect (WXC) ROADM. Each ROADM 135 may multiplex or demultiplex the data traffic via the multiple optical carrier optical signals based on instructions from transport card/ROADM management system 115, as further described below.

Router management system 110 may include one or more network devices (e.g., depicted in FIG. 3) that provide instructions to the routers 125 of the transport nodes 120 of optical network 105 for controlling the queueing, routing and switching of data flows of the data traffic for transport by transport equipment 130 via multiple optical carriers (e.g., wavelengths). Router management system 110 may connect to routers 125 of transport nodes 120 of optical network 105 via, for example, one or more networks (not shown in FIG. 1) that are different from optical network 105. For example, the one or more different networks may include one or more of a Public Switched Telephone Network (PSTN), a wireless network, a local area network (LAN), a wide area network (WAN), a metropolitan area network (MAN), an intranet, or the Internet. The wireless network may include a satellite network, a Public Land Mobile Network (PLMN), or a wireless LAN or WAN (e.g., Wi-Fi). Router management system 110 is depicted with a connection to each of router A 125-A, router B 125-B, and router C 125-C.

Transport card/ROADM management system 115 may include one or more network devices (e.g., depicted in FIG. 3) that provide instructions to transport equipment 130 and ROADMs 135 of transport nodes 120 of optical network 105 for configuring optical carrier configuration patterns for sending and receiving data traffic via multiple optical carrier (e.g., multiple wavelength) optical signals over multiple optical fibers. Each optical carrier configuration pattern may include, for example, multiple optical wavelengths having certain switched paths from a transport card through a ROADM to one or more destination transport nodes. Therefore, in one implementation, a change in optical carrier configuration patterns may include changing from a first wavelength configuration pattern that includes multiple optical wavelengths having first switched paths through a ROADM to the one or more destination transport nodes, to a second wavelength configuration pattern that includes the multiple optical wavelengths having second switched paths through the ROADM to the one or more destination transport nodes, where at least one of the second switched paths is different from at least one of the first switched paths. Transport card/ROADM management system 115 is depicted with a connection to each of transport equipment A 130-A, ROADM A 135-A, transport equipment B 130-B, ROADM B 135-B, transport equipment C 130-C and ROADM C 135-C (with the connective links between system 115 and transport equipment C 130-C and ROADM C 135-C shown passing behind transport node 120-B).

The configuration of components of network environment 100 illustrated in FIG. 1 is for illustrative purposes. Other configurations may be implemented. Therefore, network environment 100 may include additional, fewer and/or different components that may be configured in a different arrangement from that depicted in FIG. 1. For example, network environment 100 may include numerous transport nodes 120. Additionally, router management system 110 and transport card/ROADM management system 115 are depicted as separate network devices. In other implementations, router management system 110 and transport card/ROADM management system may be implemented together within a single network device.

Figure 2:
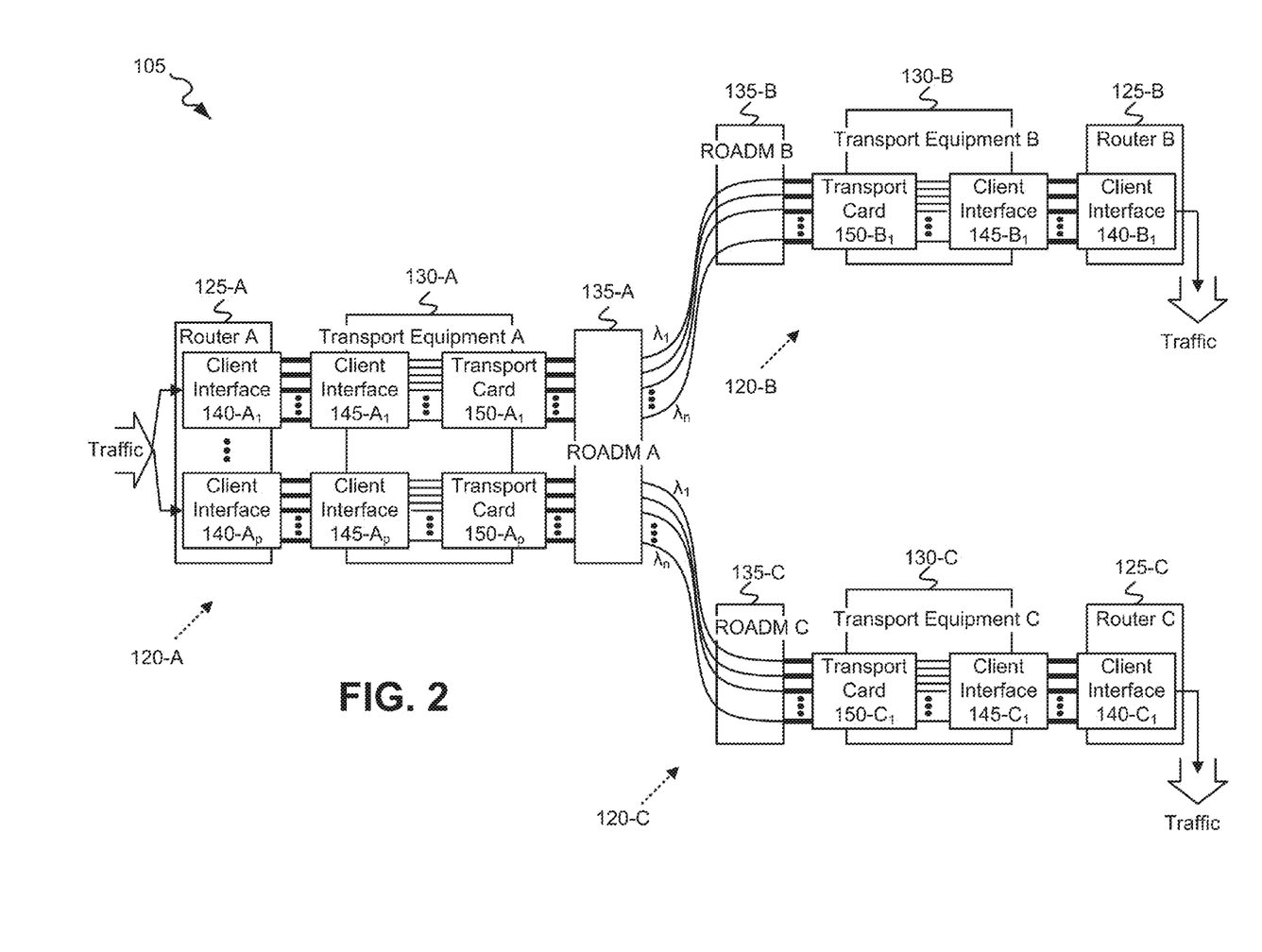
FIG. 2 is a diagram that depicts exemplary optical transport nodes of the optical network of FIG. 1.

FIG. 2 is a diagram that depicts exemplary transport nodes 120-A, 120-B and 120-C of multi-wavelength optical network 105 of FIG. 1. As shown, transport node 120-A may include router A 125-A, transport equipment A 130-A, and ROADM A 135-A. Router A 125-A may have multiple client interfaces 140-$A_1$ through 140-$A_p$ (where p is an integer greater than or equal to 2). Transport equipment A 130-A may have multiple client interfaces 145-$A_1$ through 145-$A_p$ and multiple transport cards 150-$A_1$ through 150-$A_p$. Each client interface and transport card of router 125-A and transport equipment 130-A transports multiple optical carriers (e.g., wavelengths $\lambda_1$ through $\lambda_n$). Transport nodes 120-B and 120-C may each be similarly configured, with similar components, to transport node 120-A. FIG. 2 depicts transport node 120-B as including ROADM B 135-B, transport equipment B 130-B, and router B 125-B. For purposes of simplicity, transport equipment B 130-B is shown as including only a single transport card 150-$B_1$ and only a single client interface 145-$B_1$, and router B 125-B is shown as including only a single client interface 140-$B_1$. FIG. 2 further depicts transport node 120-C as including ROADM C 135-C, transport equipment C 130-C, and router C 125-C.

Again, for purposes of simplicity, transport equipment C 130-C is shown as only including a single transport card 150-$C_1$ and only a single client interface 145-$C_1$, and router C 125-C is shown as only including a single client interface 140-$C_1$. Transport equipment B 130-B and transport equipment C 130-C may each include multiple transport cards 150 and multiple client interfaces 145, and router B 125-B and router C 125-C may each include multiple client interfaces 140 similar to those depicted for transport node 120-A.

In the single direction of data traffic transmission shown in FIG. 2, incoming data traffic is routed by router 125-A for transmission at client interfaces 140-$A_1$ through 140-$A_p$ towards a destination transport node. Client interfaces 140-$A_1$ through 140-$A_p$ may include interface circuitry and optical components for transmitting the data traffic as optical signals via multiple different optical carriers (e.g., wavelengths $\lambda_1$-$\lambda_n$). For example, if router A 125-A supports 8 different optical wavelengths (n=8), then each of client interfaces 140-$A_1$ through 140-$A_p$ may transmit optical signals via the 8 different optical wavelengths.

Client interfaces 145-$A_1$ through 145-$A_p$ of transport equipment A 130-A may include optical components and circuitry for receiving the optical signals, via multiple different optical carriers (e.g., wavelengths), from a respective client interface 140 of router A 125-A and may convert the optical signals to electrical signals. Client interfaces 145-$A_1$ through 145-$A_p$ of transport equipment A 130-A may supply the electrical signals to respective ones of transport cards 150-$A_1$ through 150-$A_p$. Transport cards 150-$A_1$ through 150-$A_p$ may include circuitry and optical components for converting the electrical signals, corresponding to the data traffic, to optical signals transmitted via one or more optical carriers (e.g., wavelengths) of multiple optical carriers, and for transmitting the optical signals to ROADM A 135-A. ROADM A 135-A may, based on switching control instructions received from system 115 (not shown in FIG. 2), selectively switch each optical carrier (e.g., wavelength) carrying optical signals corresponding to the data traffic on outgoing optical fibers to destination transport node 120-B or transport node 120-C. In the example depicted in FIG. 2, ROADM A 135-A is shown as transmitting optical signals via optical wavelengths $\lambda_1$-$\lambda_n$ on optical fibers to transport node 120-B, and ROADM A 135-A is further shown as transmitting optical signals via optical wavelengths $\lambda_1$-$\lambda_n$ on optical fibers to transport node 120-C.

Upon receipt of the optical signals, via n different optical carriers (e.g., wavelengths), at transport node 120-B, ROADM B 135-B switches the signals to transport card 150-$B_1$. Transport card 150-$B_1$ includes optical components and circuitry for receiving the optical signals, via the n different optical carriers (e.g., wavelengths), from ROADM B 135-B, converts the optical signals to electrical signals, and supplies the electrical signals to client interface 145-$B_1$.

Client interface 145-$B_1$ of transport equipment B 130-B may include circuitry and optical components for receiving the electrical signals, and converting the electrical signals to optical signals, corresponding to the data traffic, for transmission to client interface 140-$B_1$ of router B 125-B. Router B 125-B may receive the optical signals as outgoing data traffic, and may, based on existing routing algorithms and also based on instructions from system 110, queue, route and/or switch the data traffic to an outgoing client interface (not shown) for transmission to a next transport node, or to a network endpoint.

Upon receipt of the optical signals, via n different optical carriers (e.g., wavelengths), at transport node 120-C, ROADM B 135-C switches the signals to transport card 150-$C_1$. Transport card 150-$C_1$ includes optical components and circuitry for receiving the optical signals, via the n different optical carriers (e.g., wavelengths), from ROADM C 135-C, converts the optical signals to electrical signals, and supplies the electrical signals to client interface 145-$C_1$.

Client interface 145-$C_1$ of transport equipment C 130-C may include circuitry and optical components for receiving the electrical signals, and converting the electrical signals to optical signals, corresponding to the data traffic, for transmission to client interface 140-$C_1$ of router C 125-C. Router C 125-C may receive the optical signals as outgoing data traffic, and may, based on existing routing algorithms and also based on instructions from system 110, queue, route and/or switch the data traffic to an outgoing client interface (not shown) for transmission to a next transport node, or to a network endpoint.

Figure 3:
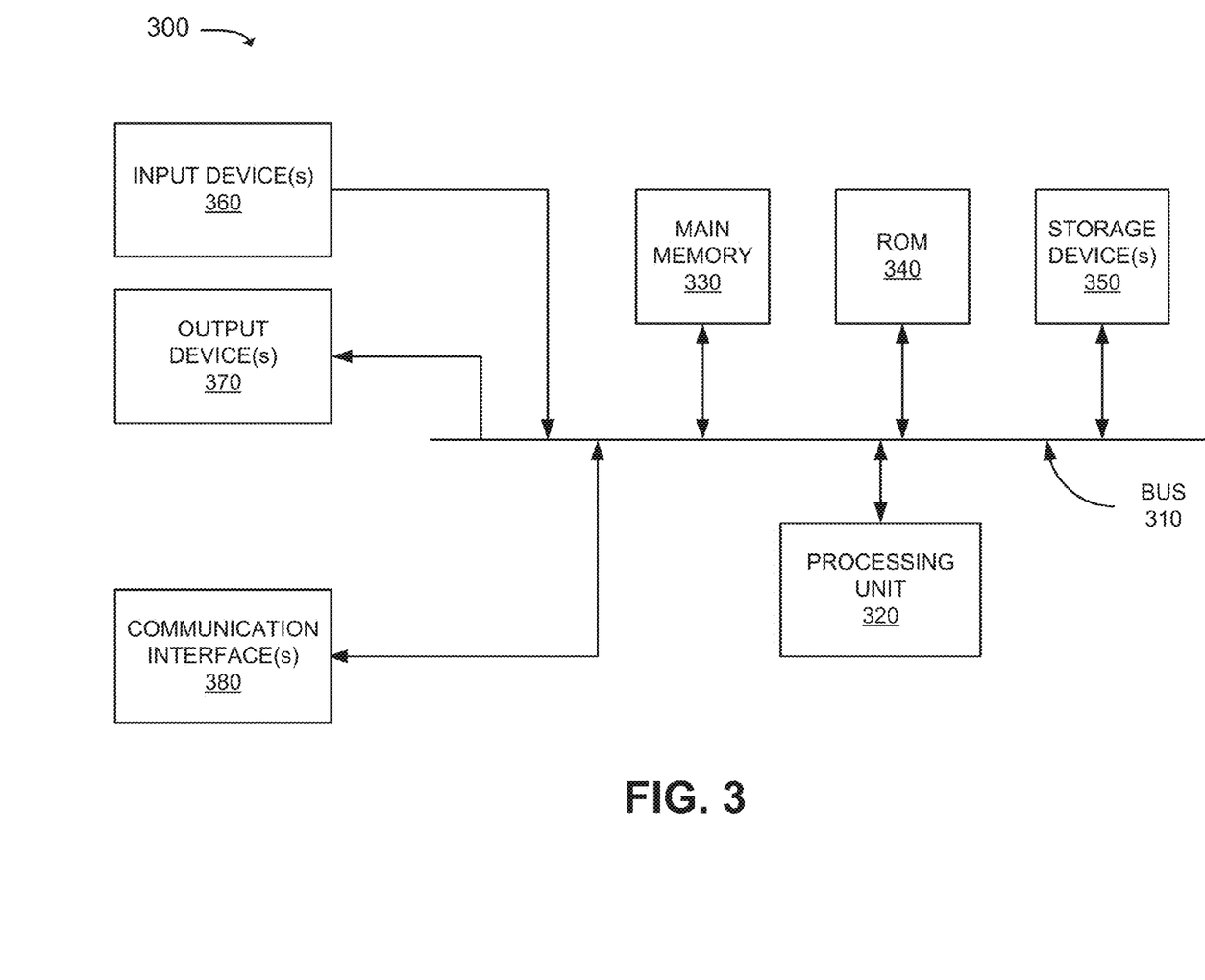
FIG. 3 is a diagram that depicts exemplary components of a device that may correspond to either, or both, of the router management system and/or the transport card/Reconfigurable Optical Add/Drop Multiplexer management system of FIG. 1.

FIG. 3 is a diagram that depicts exemplary components of a device 300. Router management system 110 and transport card/ROADM management system 115 may each have the same or similar components in a same or similar configuration to that of device 300 shown in FIG. 3. Device 300 may include a bus 310, a processing unit 320, a main memory 330, a read only memory (ROM) 340, a storage device 350, an input device(s) 360, an output device(s) 370, and a communication interface(s) 380. Bus 310 may include a path that permits communication among the elements of device 300.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. Read Only Memory (ROM) 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium."

Input device 360 may include one or more mechanisms that permit an operator (or user) to input information to device 300, such as, for example, a keypad or a keyboard, a display with a touch sensitive panel, voice recognition and/or biometric mechanisms, etc. Output device 370 may include one or more mechanisms that output information to the operator, including a display, a speaker, etc. Communication interface(s) 380 may include a transceiver that enables device 400 to communicate with other devices and/or systems. For example, communication interface(s) 380 may include a wired or wireless transceiver for communicating with transport nodes 120, possibly via an intervening network (not shown).

The configuration of components of device 300 illustrated in FIG. 3 is for illustrative purposes only. Other configurations may be implemented. Therefore, device 300 may include additional, fewer and/or different components, or differently arranged components, from those depicted in FIG. 3.

Figure 4:
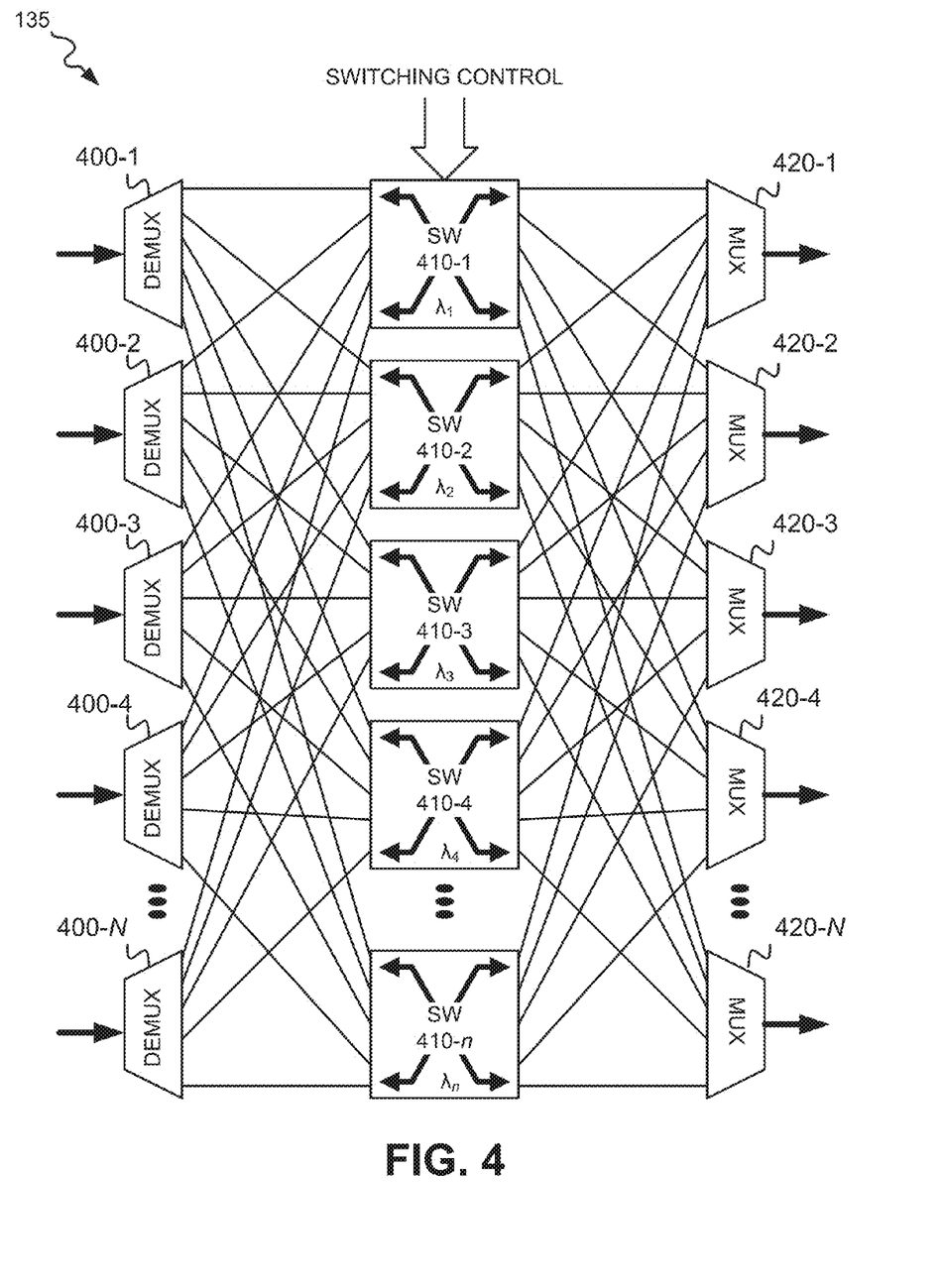
FIG. 4 is a diagram that illustrates a Reconfigurable Optical Add/Drop Multiplexer of FIG. 1 according to an exemplary implementation.

FIG. 4 depicts a ROADM 135 according to an exemplary implementation. In the exemplary implementation of FIG. 4, ROADM 135 includes a Wavelength Crossconnect (WXC) type of ROADM. In other implementations, ROADM 135 may include other types of ROADMs such as, for example, a Planar Lightwave Circuit (PLC) ROADM or a Wavelength Selective Switch (WSS) ROADM. The WXC type of ROADM depicted in FIG. 4 provides N×N connectivity. For a degree N-1 node and n wavelengths per fiber, the WXC type of ROADM uses N demultiplexers, N Multiplexers, and n N×N switches.

ROADM 135 may include multiple optical demultiplexers 400-1 through 400-N, multiple optical switches 410-1 through 410-n, and multiple optical multiplexers 420-1 through 420-N.

Each of demultiplexers 400-1 through 400-N (generically referred to herein as a "demultiplexer 400") receive optical signals carried by multiple optical carriers (e.g., wavelengths $\lambda_1$ through $\lambda_n$) over an optical fiber (as depicted by the bold arrows at the left-hand side of FIG. 4). Demultiplexer 400 demultiplexes the multiple optical wavelengths into single output wavelengths and outputs each wavelength $\lambda$ to its respective switch of switches 410-1 through 410-n. For example, demux 400-1 demultiplexes optical signals on each of wavelengths $\lambda_1$ through $\lambda_n$ and sends optical signals for wavelength $\lambda_1$ to switch 410-1, optical signals for wavelength $\lambda_2$ to switch 410-2, etc.

Switches 410-1 through 410-n (generically and individually referred to herein as a "switch 410") may receive optical signals carried on a single optical wavelength from each of demuxes 400-1 through 400-N, and may switch the optical signals to one of Multiplexers 420-1 through 420-N based on switching control instructions. Each switch 410 operates on a single optical wavelength and switches optical signals carried on that optical wavelength from any input port to any output port. For example, switch 410-1 may switch optical signals received on wavelength $\lambda_1$ from demultiplexer 400-1 to multiplexer 420-N for output on an optical fiber from ROADM 135. As another example, switch 410-4 may switch optical signals received on wavelength $\lambda_4$ from demultiplexer 400-3 to multiplexer 420-1 for output on an optical fiber from ROADM 135. Each of multiplexers 420-1 through 420-N (generically referred to herein as "multiplexer 420") may multiplex optical signals carried on one or more different wavelengths, received from switches 410-1 through 410-n, for output to an optical fiber.

The configuration of components of device ROADM 135 illustrated in FIG. 4 is for illustrative purposes only. Other configurations may be implemented. Therefore, ROADM 135 may include additional, fewer and/or different components, or differently arranged components, than those depicted in FIG. 4. For example, ROADM 135 may alternatively include a PLC ROADM or a WSS ROADM.

Figure 5:
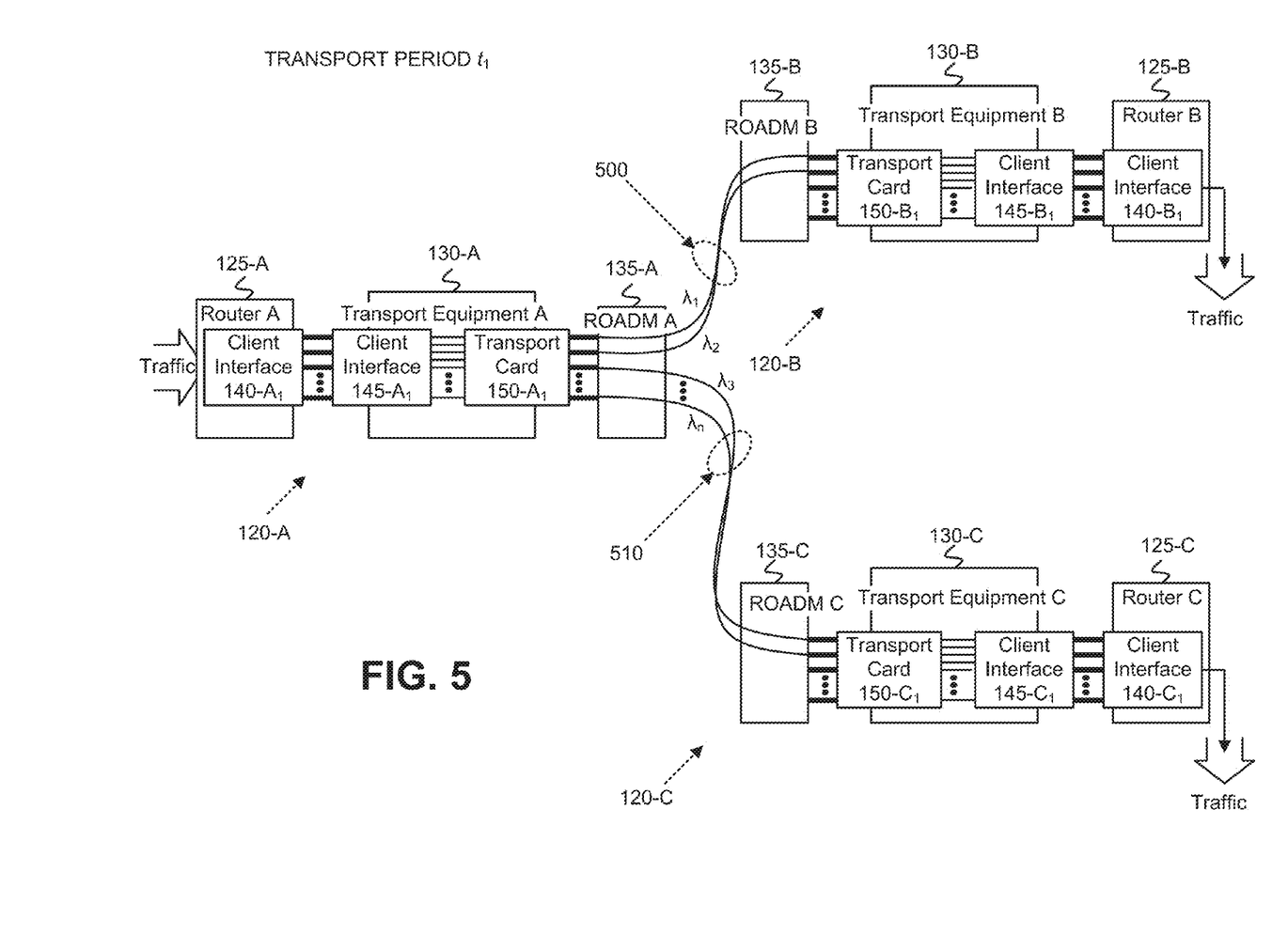
FIGS. 5 and 6 are diagrams that depict examples of flexible channel coordination of the optical transport nodes of FIG. 2 during two different transport periods.
Figure 6:
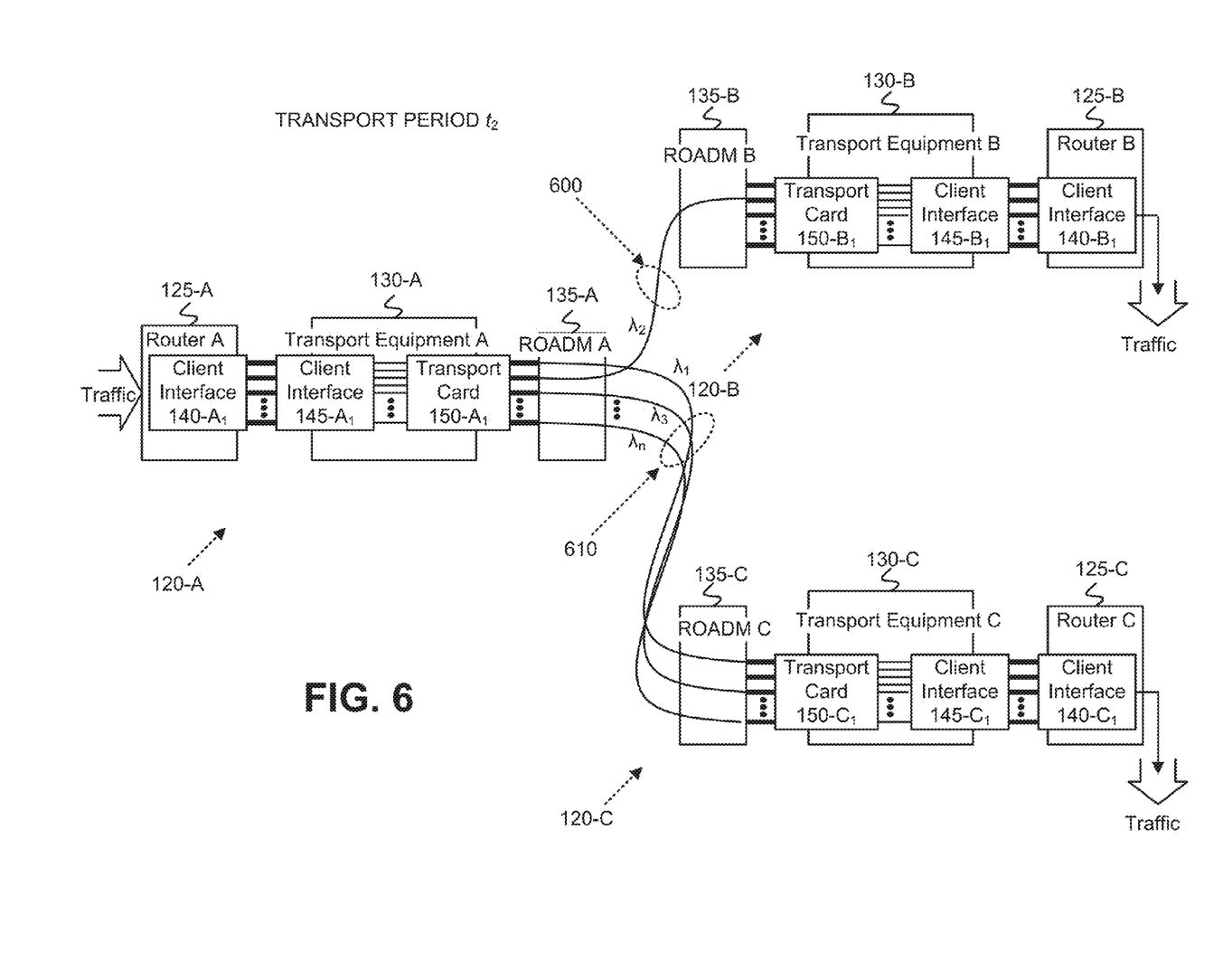

FIGS. 5 and 6 depict examples of flexible channel coordination of the optical transport nodes 120 of FIG. 2 during two different transport periods. A "transport period," as referred to herein includes a single window of time, with each transport period succeeding one another. Each transport period may be a same length of time, or the length of each transport period may be controlled by systems 110 and/or 115. In FIG. 5, during a first transport period $t_1$, a selected first set 500 of multiple optical carriers (e.g., wavelengths) are switched through ROADM A 135-A to destination transport node 120-B; and a selected second set 510 of the multiple optical carriers (e.g., wavelengths) are switched through ROADM A 135-A to destination transport node 120-C. In FIG. 6, during a second transport period $t_2$, a selected third set 600 of multiple optical carriers (e.g., wavelengths) are switched through ROADM A 135-A to destination transport node 120-B, and a selected fourth set 610 of the multiple optical carriers (e.g., wavelengths) are switched through ROADM A 135-A to destination transport node 120-C. As can be seen in FIG. 5, first set 500 of the multiple optical carriers includes wavelengths $\lambda_1$ and $\lambda_2$, and second set 510 of the multiple optical carriers includes wavelengths $\lambda_3$ through $\lambda_n$. As can be seen in FIG. 6, third set 600 of the multiple optical carriers includes wavelength $\lambda_2$, and fourth set 610 of the multiple optical carriers includes wavelength $\lambda_1$, and wavelengths $\lambda_3$ through $\lambda_n$.

Returning to FIG. 5, during transport period $t_1$, incoming data traffic is received at router A 125-A of transport node 120-A. Router A 125-A, using a routing algorithm and based on instructions received from router management system 110, determines an outgoing client interface 140-$A_1$ via which to send each data flow of the data traffic. A "data flow," as described herein, refers to a series of data units (e.g., data frames or data packets) sent between a source and a destination during a given session. Client interface 140-$A_1$ sends the data traffic, as optical signals via multiple optical carriers (e.g., wavelengths $\lambda_1$ through $\lambda_n$), to a client interface 145-$A_1$ of transport equipment A 130-A. Client interface 145-$A_1$ converts the optical signals of the data traffic to electrical signals, and sends the data traffic as electrical signals to transport card 150-$A_1$. Transport card 150-$A_1$ converts the data traffic, as electrical signals, back to optical signals and sends the optical signals via multiple optical carriers (e.g., wavelengths $\lambda_1$ through $\lambda_n$) to ROADM A 135-A. ROADM A 135-A, during transport period $t_1$ and based on switching control instructions from transport card/ROADM management system 115, switches wavelengths $\lambda_1$ and $\lambda_2$ (as shown in FIG. 5) for transport to destination transport node 120-B via one or more optical fibers connected to ROADM B 135-B, and switches wavelengths $\lambda_3$ through $\lambda_n$ (as shown in FIG. 6) for transport to destination transport node 120-C via one or more optical fibers connected to ROADM C 135-C.

Referring to FIG. 6, during transport period $t_2$, incoming data traffic is received at router A 125-A of transport node 120-A. Router A 125-A, using a routing algorithm and based on additional instructions received from router management system 110, determines an outgoing client interface 140-$A_1$ via which to send each data flow of the data traffic. Client interface 140-$A_1$ sends the data traffic, as optical signals via multiple optical carriers (e.g., wavelengths $\lambda_1$ through $\lambda_n$), to a client interface 145-$A_1$ of transport equipment A 130-A. Client interface 145-$A_1$ converts the optical signals of the data traffic to electrical signals, and sends the data traffic as electrical signals to transport card 150-$A_1$. Transport card 150-$A_1$ converts the data traffic, as electrical signals, back to optical signals and sends the optical signals via multiple optical carriers (e.g., wavelengths $\lambda_1$ through $\lambda_n$) to ROADM A 135-A. ROADM A 135-A, during transport period $t_2$ and based on additional switching control instructions from transport card/ROADM management system 115, switches wavelength $\lambda_2$ (as shown in FIG. 6) for transport to destination transport node 120-B via an optical fiber connected to ROADM B 135-B, and switches wavelengths $\lambda_1$, and $\lambda_3$ through $\lambda_n$ (as shown in FIG. 6) for transport to destination transport node 120-C via one or more optical fibers connected to ROADM C 135-C. The selective switching of different optical wavelengths to destination nodes may continue at each subsequent transport period based on instructions generated by systems 110 and 115.

Figure 7A:
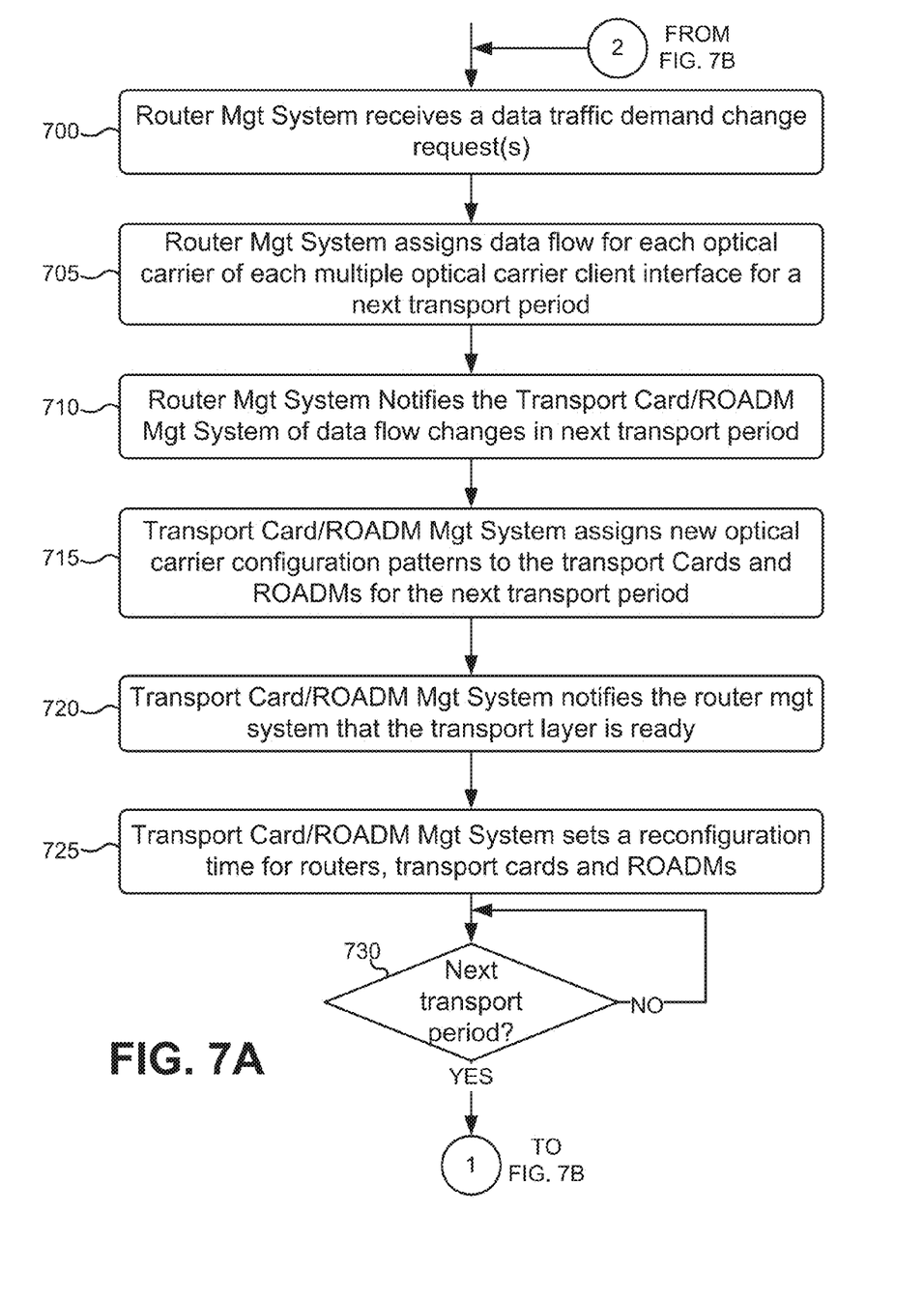
FIGS. 7A and 7B are flow diagrams that illustrate an exemplary process for flexible channel coordination during optical transport in the network environment of FIG. 1.
Figure 7B:
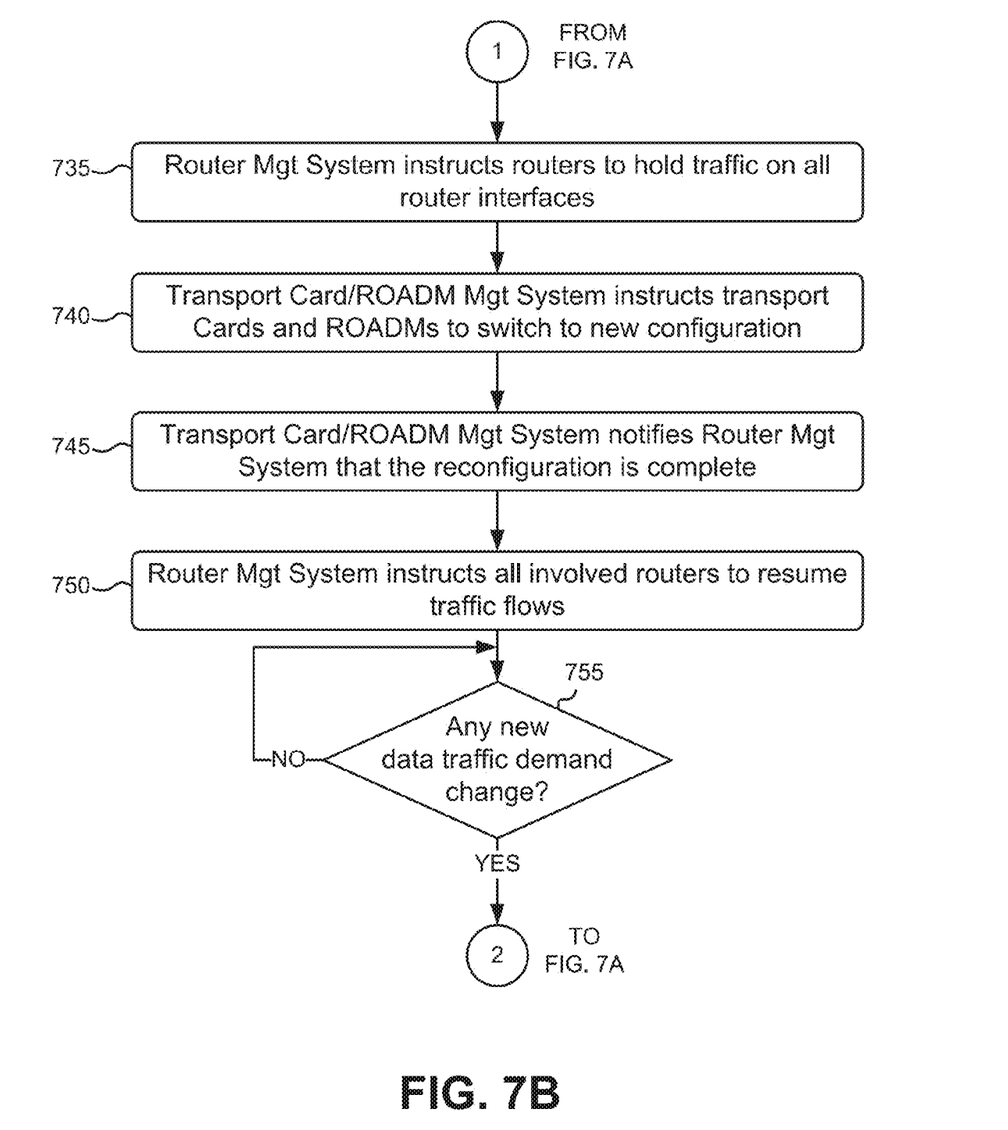

FIGS. 7A and 7B are flow diagrams that illustrate an exemplary process for flexible channel coordination during optical transport in the network environment 100 of FIG. 1. The exemplary process of FIGS. 7A and 7B may be implemented by router management system 110 and transport card/ROADM management system 115. The exemplary process of FIGS. 7A and 7B is described below with reference to FIGS. 2, 5 and 6.

The exemplary process may include router management system 110 receiving a data traffic demand change request(s) (block 700). In some embodiments, data traffic demand change requests may be automatically generated within network 105 based on a current traffic load at one or more of the transport nodes of network 105. For example, a node in network 105 that monitors a current traffic load, and changes in data traffic demand, may automatically generate a demand change request based on the monitored current traffic load. In some embodiments, router management system 110 may receive a data traffic demand change request from one or more customers of optical network 105. The data traffic demand change request from the one or more customers may be based on a customer need for improved bandwidth, or a need for improvement in other data traffic delivery metrics.

Router management system 110 may assign a new data flow for each optical carrier (e.g., wavelength) of each multiple optical carrier (e.g., multi-wavelength) client interface for a next transport period (block 705). Router management system 110, therefore, identifies the data flow(s) at each transport node 120, and assigns an optical carrier (e.g., wavelength), of multiple optical carriers, of an appropriate outgoing client interface 140 of router 125 to each of the data flows. For example, when the multiple optical carriers include light of multiple different wavelengths, a first data flow may be assigned to wavelength $\lambda_1$, and a second data flow may be assigned to wavelength $\lambda_2$. The outgoing interface 140 of router 125 may be determined based on a routing algorithm performed by router 125. In assigning the optical wavelength to the data flow, router management system 110 coordinates among all of the data flows for a particular outgoing client interface 140 of router 125.

Router management system 110 may notify transport card/ROADM management system 115 of data flow changes in a next transport period (block 710). Based on the assignment of an optical carrier (e.g., wavelength), of the multiple optical carriers (e.g., multiple wavelengths), of an outgoing client interface 140 of router 125 for each data flow, router management system 110 notifies transport card/ROADM management system 115 of the data flow changes and the corresponding optical carrier (e.g., wavelength) assignments. Transport card/ROADM management system 115 may assign new optical carrier configuration patterns (e.g., new wavelength configuration patterns) to the transport cards and ROADMs for the next transport period (block 715). The notification from router management system 110 includes data indicating an optical carrier (e.g., wavelength) assigned to each data flow for a given client interface 140 of router 125. For example, transport card/ROADM management system 115 identifies the corresponding optical wavelength output from a transport card 150 of transport equipment 130 and determines the switching configuration of the ROADM 135 that is connected to the transport equipment 130 to connect the data flow's assigned optical wavelength on a switched path to the destination transport node 120 for the data traffic corresponding to the particular data flow. Referring to the example of FIG. 5, if a first data flow, destined for transport node 120-B, has been assigned optical wavelength $\lambda_1$ during transport period $t_1$, then transport card/ROADM management system 115 identifies the input to ROADM A 135-A on wavelength $\lambda_1$ from transport card 150-$A_1$, and determines the switching configuration that switches that input to an output of ROAM A 135-A connected to an optical fiber that further connects, either directly or indirectly via intervening nodes, to destination transport node 120-B. During transport period $t_1$, the first data flow may then be transported via optical signals of wavelength $\lambda_1$ over the switched path (e.g., path including client interface 140-$A_1$, client interface 145-$A_1$, transport card 150-$A_1$, and switched path through ROADM A 135-A that connects $\lambda_1$ of transport card 150-A1 to transport node 120-B) of the switching configuration determined by transport card/ROADM management system 115.

Referring to another example in FIG. 5, if a second data flow, destined for transport node 120-C, has been assigned optical wavelength $\lambda_3$ during transport period $t_1$, then transport card/ROADM management system 115 identifies the input to ROADM A 135-A on wavelength $\lambda_3$ from transport card 150-$A_1$, and switches that input to an output of ROADM A 135-A connected to an optical fiber that further connects, either directly or indirectly via intervening nodes, to destination transport node 120-C. During transport period $t_1$, the second data flow may then be transported via optical signals of wavelength $\lambda_3$ over the switched path (e.g., path including client interface 140-$A_1$, client interface 145-$A_1$, transport card 150-$A_1$, and switched path through ROADM A 135-A that connects $\lambda_3$ of transport card 150-A1 to transport node 120-C) of the switching configuration determined by transport card/ROADM management system 115.

Transport card/ROADM management system 115 may notify router management system 110 that the transport layer is ready (block 720). Transport card/ROADM management system 115 may send a notification message to router management system 110 that includes data indicating that the wavelength configuration patterns for affected transport nodes is set for a given transport period. Transport card/ROADM management system 115 sets a reconfiguration time for routers 125, transport cards 150, and ROADMs 135 (block 725). The reconfiguration time set by system 115 may involve an estimate of the time required to make the data flow changes at client interfaces 140 of routers 125, and the changes in optical carrier configuration patterns (e.g., wavelength configuration patterns) at transport cards 150 and ROADMs 135, and when the next transport period shall begin. Transport card/ROADM management system 115 may notify router management system 105 of the reconfiguration time and when the next transport period shall begin.

Router management system 110 determines if a next transport period is beginning (block 730). Router management system 110 may keep track of a current transport period, when the current transport period ends, and when the next transport period begins based on the reconfiguration time notification received from transport card/ROADM management system 115. If the next transport period has not yet begun (NO—block 730), then block 730 may repeat until the beginning of the next transport period. If a next transport period is beginning (YES—block 730), then router management system 110 instructs the routers 125 to hold traffic on all router interfaces (block 735). Router management system 110 sends a message to each router 125 of each transport node 120 instructing each client interface 140 to buffer all outgoing traffic.

Transport card/ROADM management system 115 instructs transport cards and ROADMs to switch to the new configuration (block 740). Transport card/ROADM management system 115 sends instructions to each transport card 150 and ROADM 135 to switch to the new wavelength configuration pattern assigned in block 715. Transport card/ROADM management system 115 notifies router management system 105 when the reconfiguration is complete (block 745). Once each transport card 150 and ROADM 135 has switched to the new optical carrier configuration pattern (e.g., wavelength configuration pattern), transport card/ROADM management system 115 sends a message to router management system 110 that the wavelength configuration pattern change is completed. Router management system 110 instructs all involved routers to resume traffic flows (block 750). Router management system 110 sends a message to each involved router 125 to stop buffering data flows, and to begin transmitting the data traffic of the data flows out assigned optical carriers (e.g., wavelengths) of outgoing client interfaces 140.

Router management system 110 determines if there is a new data traffic demand change (block 755). In some embodiments, new data traffic demand change requests may be automatically generated within network 105 based on a current traffic load at one or more of the transport nodes of network 105. For example, a node in network 105 that monitors a current traffic load, and changes in data traffic demand, may automatically generate a demand change request based on the monitored current traffic load. In some embodiments, router management system 110 may receive a new data traffic demand change request from one or more customers. The data traffic demand change request from the one or more customers may be based on a customer need for improved bandwidth, or a need for improvement in other data traffic delivery metrics. If there is no new data traffic demand change (NO—block 755), then the exemplary process loops at block 755 until a change in data traffic demand occurs. If there is a new data traffic demand change (YES—block 755), then the exemplary process returns to block 700 with router management system 110 receiving a data traffic demand change request.

Figure 8:
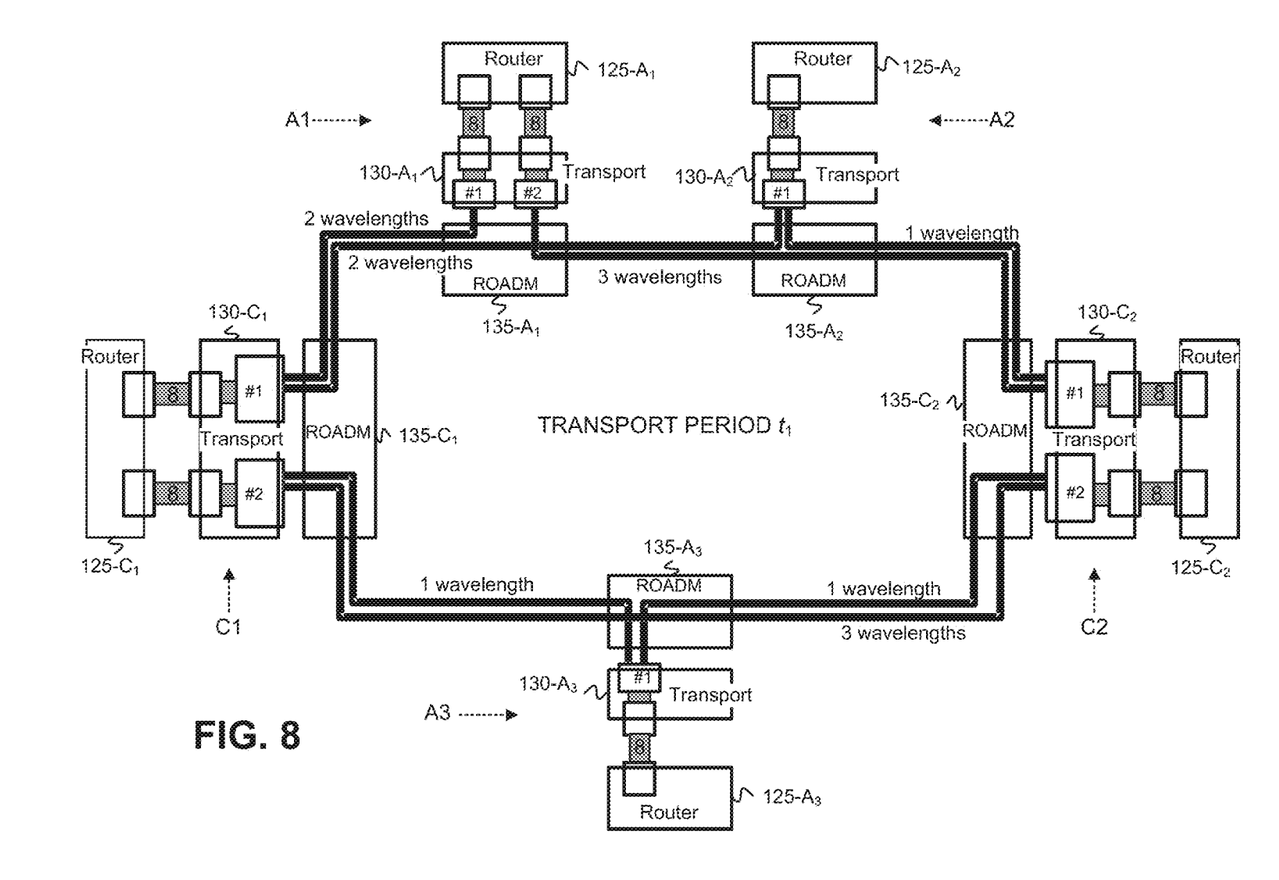
FIGS. 8 and 9 are diagrams that depict examples of channel coordination among multiple optical transport nodes during two different transport periods.
Figure 9:
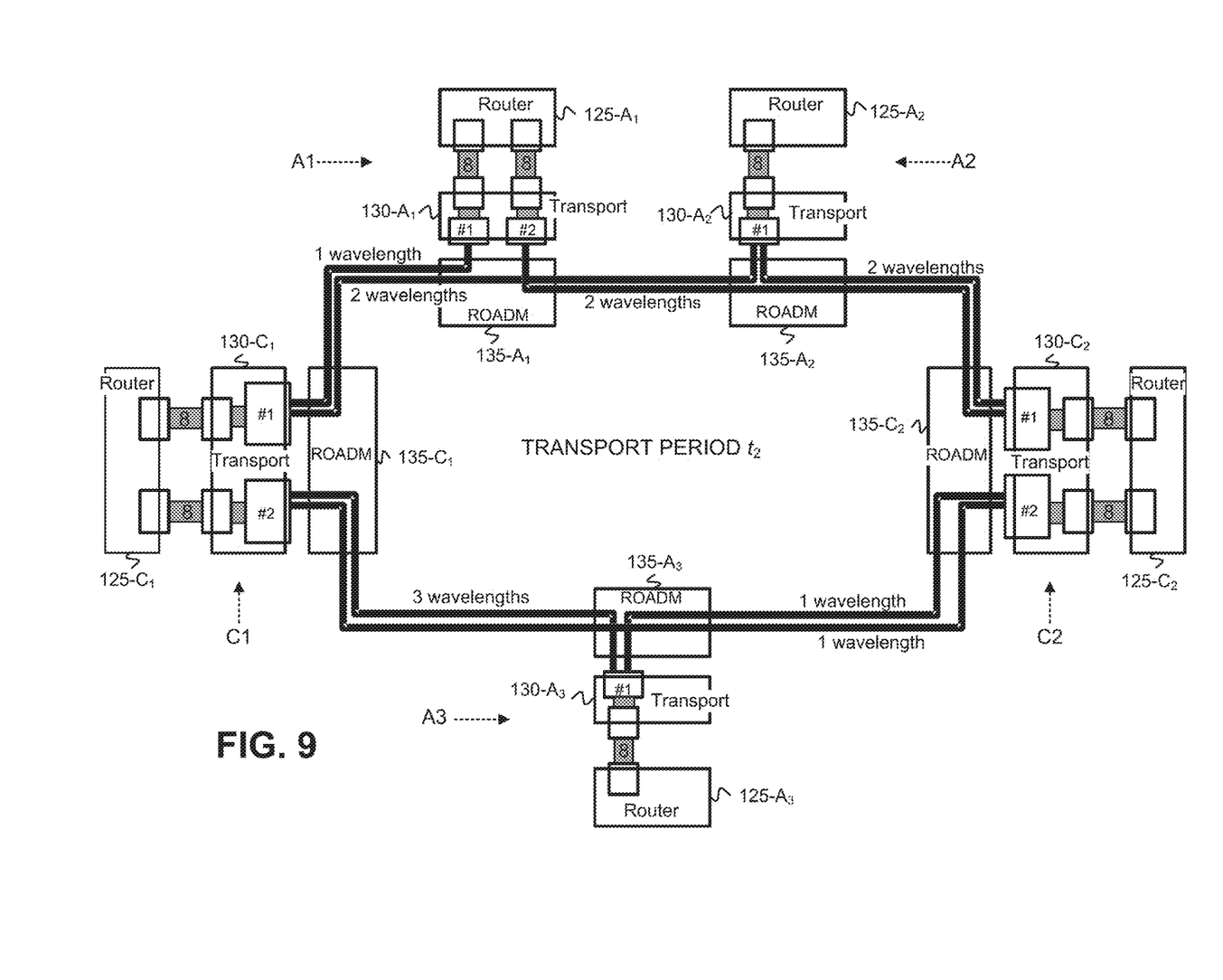

FIGS. 8 and 9 depict examples of channel coordination among multiple optical transport nodes during two different transport periods. FIGS. 8 and 9 involve a specific example of a portion of optical network 105 in which transport nodes C1, C2, A1, A2 and A3 are interconnected, and changes that occur in optical carrier configuration patterns (e.g., wavelength configuration patterns) between the transport nodes over two transport periods $t_1$ and $t_2$. In the examples of FIGS. 8 and 9, each client interface of routers 125, and each client interface and transport card of transport equipment 130, handles eight optical carriers (e.g., optical wavelengths $\lambda_1$ through $\lambda_8$).

As shown in FIG. 8, during transport period $t_1$, ROADM 135-$C_1$ and ROADM 135-$A_1$ switch two optical wavelengths from a first transport card of transport equipment 130-$C_1$ of transport node C1 to a first transport card of transport equipment 130-$A_1$ of transport node A1. Additionally, during transport period $t_1$, ROADM 135-$C_1$ and ROADM 135-$A_2$ switch another two optical wavelengths from the first transport card of transport equipment 130-$C_1$ of transport node $C_1$ to a transport card of transport equipment 130-$A_2$ of transport node A2.

Furthermore, during transport period $t_1$, ROADM 135-$C_1$ and ROADM 135-$A_3$ switch 1 optical wavelength from a second transport card of transport equipment 130-$C_1$ of transport node $C_1$ to a transport card of transport equipment 130-$A_3$ of transport node A3. Also, during transport period $t_1$, ROADM 135-$C_1$ and ROADM 135-$C_2$ switch another three optical wavelengths from the second transport card of transport equipment 130-$C_1$ of transport node C1 to a second transport card of transport equipment 130-$C_2$ of transport node C2.

FIG. 8 additionally depicts ROADM 135-$A_1$ and ROADM 135-$C_2$ switching, during transport period $t_1$, 3 optical wavelengths from a second transport card of transport equipment 130-$A_1$ of transport node A1 to a first transport card of transport equipment 130-$C_2$ of transport node C2. As shown, ROADM 135-$A_2$ and ROADM 135-$C_2$ further, during transport period $t_1$, switch 1 optical wavelength from the transport card of transport equipment 130-$A_2$ of transport node A2 to the first transport card of transport equipment 130-$C_2$ of transport node C2. ROADM 135-A3 and ROADM 135-$C_2$ further, during transport period $t_1$, switch 1 optical wavelength from the transport card of transport equipment 130-$A_3$ of transport node A3 to the second transport card of transport equipment 130-$C_2$ of transport node C2.

FIG. 9 depicts wavelength configuration pattern changes that occur among the transport nodes C1, C2, A1, A2 and A3 at the occurrence of transport period $t_2$. Transport nodes C1, C2, A1, A2 and A3 may receive instructions from transport card/ROADM management system 115 to institute the changes in wavelength configuration patterns based on, for example, a change in data traffic demand in optical network 105.

As shown in FIG. 9, during transport period $t_2$, ROADM 135-$C_1$ and ROADM 135-$A_1$ switch 1 optical wavelength from a first transport card of transport equipment 130-$C_1$ of transport node C1 to a first transport card of transport equipment 130-$A_1$ of transport node A1. Additionally, during transport period $t_2$, ROADM 135-$C_1$ and ROADM 135-$A_2$ switch another two optical wavelengths from the first transport card of transport equipment 130-$C_1$ of transport node $C_1$ to a transport card of transport equipment 130-$A_2$ of transport node A2.

Furthermore, during transport period $t_2$, ROADM 135-$C_1$ and ROADM 135-$A_3$ switch 3 optical wavelengths from a second transport card of transport equipment 130-$C_1$ of transport node $C_1$ to a transport card of transport equipment 130-$A_3$ of transport node A3. Also, during transport period $t_2$, ROADM 135-$C_1$ and ROADM 135-$C_2$ switch another single optical wavelength from the second transport card of transport equipment 130-$C_1$ of transport node C1 to a second transport card of transport equipment 130-$C_2$ of transport node C2.

FIG. 9 additionally depicts ROADM 135-$A_1$ and ROADM 135-$C_2$ switching, during transport period $t_2$, 2 optical wavelengths from a second transport card of transport equipment 130-$A_1$ of transport node A1 to a first transport card of transport equipment 130-$C_2$ of transport node C2. As shown, ROADM 135-$A_2$ and ROADM 135-$C_2$ further, during transport period $t_2$, switch 2 optical wavelengths from the transport card of transport equipment 130-$A_2$ of transport node A2 to the first transport card of transport equipment 130-$C_2$ of transport node C2. ROADM 135-A3 and ROADM 135-$C_2$ further, during transport period $t_2$, switch 1 optical wavelength from the transport card of transport equipment 130-$A_3$ of transport node A3 to the second transport card of transport equipment 130-$C_2$ of transport node C2.

At each transport period subsequent to transport periods $t_1$ and $t_2$ (not shown in FIGS. 8 and 9), transport card/ROADM management system 115 may instruct transport nodes C1, C2, A1, A2 and A3 to institute additional changes in wavelength configuration patterns to change which optical wavelengths of wavelengths $\lambda_1$ through $\lambda_8$ are switched from a given transport card of transport equipment 130 through a ROADM 135 to another transport equipment 130 via another ROADM 135.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIGS. 7A and 7B, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
assigning, at a network device for a first transport period, a first multiple optical wavelength configuration pattern to multiple transport cards and multiple Reconfigurable Optical Add/Drop Multiplexers (ROADMs) in an optical network;
receiving, at the network device, a first notification related to a first traffic demand change request for the optical network;
assigning, at the network device for a second transport period based on receipt of the first notification, a second multiple optical wavelength configuration pattern to the multiple transport cards and the multiple ROADMs in the optical network, wherein the second multiple optical wavelength configuration pattern is different from the first multiple optical wavelength pattern and wherein the second transport period is subsequent to the first transport period; and
instructing the multiple transport cards and the multiple ROADMs to switch from the first multiple optical wavelength configuration pattern to the second multiple optical wavelength configuration pattern at the second transport period.

2. The method of claim 1, wherein one or more of the multiple transport cards are interconnected with one or more of the multiple ROADMs.

3. The method of claim 1, wherein the first multiple optical wavelength configuration pattern comprises multiple optical wavelengths having first switched paths through a first ROADM of the multiple ROADMs.

4. The method of claim 3, wherein the first switched paths through the first ROADM of the multiple ROADMs comprise a first set of the multiple optical wavelengths switched through the first ROADM to a first destination node and a second set of the multiple optical wavelengths switched through the first ROADM to a second destination node.

5. The method of claim 4, wherein the second multiple optical wavelength configuration pattern comprises the multiple optical wavelengths having second switched paths through the first ROADM of the multiple ROADMs, and wherein the second switched paths are different from the first switched paths.

6. The method of claim 5, wherein the second switched paths through the first ROADM of the multiple ROADMs comprise a third set of the multiple optical wavelengths switched through the first ROADM to a third destination node and a fourth set of the multiple optical wavelengths switched through the first ROADM to a fourth destination node.

7. The method of claim 1, wherein each of the multiple transport cards and the multiple ROADMs transport data using multiple optical wavelengths.

8. The method of claim 1, further comprising:
receiving, at the network device, a second notification related to a second traffic demand change request for the optical network;
assigning, at the network device for a third transport period based on receipt of the second notification, a third multiple optical wavelength configuration pattern to the multiple transport cards and the multiple ROADMs in the optical network; and
instructing the multiple transport cards and the multiple ROADMs to switch from the second to the third multiple optical wavelength configuration pattern at the third transport period.

9. A network device, comprising:
a communication interface;
a processing unit configured to:
assign, for a first transport period, a first multiple optical wavelength configuration pattern to multiple transport cards and multiple Reconfigurable Optical Add/Drop Multiplexers (ROADMs) in an optical network,
receive, via the communication interface, a first notification related to a first traffic demand change request for the optical network,
assign, for a second transport period based on receipt of the first notification, a second multiple optical wavelength configuration pattern to the multiple transport cards and the multiple ROADMs in the optical network, wherein the second multiple optical wavelength configuration pattern is different from the first multiple optical wavelength pattern and wherein the second transport period is subsequent to the first transport period, and
instruct, via the communication interface, the multiple transport cards and the multiple ROADMs to switch from the first multiple optical wavelength configuration pattern to the second multiple optical wavelength configuration pattern at the second transport period.

10. The network device of claim 9, wherein the first multiple optical wavelength configuration pattern comprises multiple optical wavelengths having first switched paths through a first ROADM of the multiple ROADMs.

11. The network device of claim 10, wherein the first switched paths through the first ROADM of the multiple ROADMs comprise a first set of the multiple optical wavelengths switched through the first ROADM to a first destination node and a second set of the multiple optical wavelengths switched through the first ROADM to a second destination node.

12. The network device of claim 11, wherein the second multiple optical wavelength configuration pattern comprises the multiple optical wavelengths having second switched paths through the first ROADM of the multiple ROADMs, and wherein the second switched paths are different from the first switched paths.

13. The network device of claim 12, wherein the second switched paths through the first ROADM of the multiple ROADMs comprise a third set of the multiple optical wavelengths switched through the first ROADM to a third destination node and a fourth set of the multiple optical wavelengths switched through the first ROADM to a fourth destination node.

14. The network device of claim 9, wherein each of the multiple transport cards and the multiple ROADMs transport data using multiple optical wavelengths.

15. The network device of claim 9, wherein the processing unit is further configured to:
receive a second notification related to a second traffic demand change request for the optical network,
assign, for a third transport period based on receipt of the second notification, a third multiple optical wavelength configuration pattern to the multiple transport cards and the multiple ROADMs in the optical network, and
instruct the multiple transport cards and the multiple ROADMs to switch from the second to the third multiple optical wavelength configuration pattern at the third transport period.

16. A non-transitory storage medium storing instructions executable by a processor of a network device, wherein the instructions comprise instructions to cause the processor to:
assign, for a first transport period, a first multiple optical wavelength configuration pattern to multiple transport cards and multiple Reconfigurable Optical Add/Drop Multiplexers (ROADMs) in an optical network;
receive a first notification related to a first traffic demand change request for the optical network;
assign, for a second transport period based on receipt of the first notification, a second multiple optical wavelength configuration pattern to the multiple transport cards and the multiple ROADMs in the optical network, wherein the second multiple optical wavelength configuration pattern is different from the first multiple optical wavelength pattern and wherein the second transport period is subsequent to the first transport period; and
instruct the multiple transport cards and the multiple ROADMs to switch from the first multiple optical wavelength configuration pattern to the second multiple optical wavelength configuration pattern at the second transport period.

17. The non-transitory storage medium of claim 16, wherein the first multiple optical wavelength configuration pattern comprises multiple optical wavelengths having first switched paths through a first ROADM of the multiple ROADMs.

18. The non-transitory storage medium of claim 17, wherein the first switched paths through the first ROADM of the multiple ROADMs comprise a first set of the multiple optical wavelengths switched through the first ROADM to a first destination node and a second set of the multiple optical wavelengths switched through the first ROADM to a second destination node.

19. The non-transitory storage medium of claim 18, wherein the second multiple optical wavelength configuration pattern comprises the multiple optical wavelengths having second switched paths through the first ROADM of the multiple ROADMs, and wherein the second switched paths are different from the first switched paths.

20. The non-transitory storage medium of claim 19, wherein the second switched paths through the first ROADM of the multiple ROADMs comprise a third set of the multiple optical wavelengths switched through the first ROADM to a third destination node and a fourth set of the multiple optical wavelengths switched through the first ROADM to a fourth destination node.

21. The non-transitory storage medium of claim 16, wherein each of the multiple transport cards and the multiple ROADMs transport data using multiple optical wavelengths, and wherein one or more of the multiple transport cards are interconnected with one or more of the multiple ROADMs.

22. The non-transitory storage medium of claim 16, wherein the instructions further comprise instructions to cause the processor to:
   receive a second notification related to a second traffic demand change request for the optical network;
   assign, for a third transport period based on receipt of the second notification, a third multiple optical wavelength configuration pattern to the multiple transport cards and the multiple ROADMs in the optical network; and
   instruct the multiple transport cards and the multiple ROADMs to switch from the second to the third multiple optical wavelength configuration pattern at the third transport period.

23. A method, comprising:
   assigning, at a network device for a first transport period, a first multiple optical wavelength configuration pattern to multiple transport cards and multiple Reconfigurable Optical Add/Drop Multiplexers (ROADMs) in an optical network, wherein each of the multiple transport cards and the multiple ROADMs transport data using multiple optical wavelengths, and wherein the first multiple optical wavelength configuration pattern comprises multiple optical wavelengths having first switched paths through a first ROADM of the multiple ROADMs;
   receiving, at the network device, a first notification related to a first traffic demand change request for the optical network;
   assigning, at the network device for a second transport period based on receipt of the first notification, a second multiple optical wavelength configuration pattern to the multiple transport cards and the multiple ROADMs in the optical network, wherein the second multiple optical wavelength configuration pattern is different from the first multiple optical wavelength pattern and wherein the second transport period is subsequent to the first transport period; and
   instructing the multiple transport cards and the multiple ROADMs to switch from the first multiple optical wavelength configuration pattern to the second multiple optical wavelength configuration pattern at the second transport period.

* * * * *